US011192289B2

(12) United States Patent
Aitken et al.

(10) Patent No.: US 11,192,289 B2
(45) Date of Patent: Dec. 7, 2021

(54) REINFORCED FUEL TANK AND METHOD FOR REINFORCED FUEL TANK CONSTRUCTION

(71) Applicant: Ford Global Technologies, LLC, Dearborn, MI (US)

(72) Inventors: Brian Aitken, Livonia, MI (US); Mark Bunge, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 249 days.

(21) Appl. No.: 15/896,988

(22) Filed: Feb. 14, 2018

(65) Prior Publication Data

US 2018/0243968 A1   Aug. 30, 2018

Related U.S. Application Data

(60) Provisional application No. 62/463,522, filed on Feb. 24, 2017.

(51) Int. Cl.
| | |
|---|---|
| *B60K 15/03* | (2006.01) |
| *B60K 15/05* | (2006.01) |
| *B29C 51/26* | (2006.01) |
| *B29C 49/20* | (2006.01) |
| *B29L 31/00* | (2006.01) |

(52) U.S. Cl.
CPC .......... *B29C 51/267* (2013.01); *B29C 49/20* (2013.01); *B60K 15/03006* (2013.01); *B60K 15/03177* (2013.01); *B29C 2049/206* (2013.01); *B29C 2049/2013* (2013.01); *B29L 2031/7172* (2013.01); *B60K 2015/03032* (2013.01); *B60K 2015/03046* (2013.01); *B60K 2015/0346* (2013.01); *B60K 2015/03059* (2013.01); *B60K 2015/03335* (2013.01); *B60K 2015/03467* (2013.01); *B60K 2015/0592* (2013.01)

(58) Field of Classification Search
CPC .......... B60K 2015/03467; B60K 2015/03177; B60K 2015/03493
See application file for complete search history.

(56) References Cited

U.S. PATENT DOCUMENTS

| | | | | |
|---|---|---|---|---|
| 4,304,530 A | * | 12/1981 | Gens | B60K 15/077 137/565.01 |
| 6,135,306 A | * | 10/2000 | Clayton | B60K 15/03177 220/501 |
| 6,138,859 A | | 10/2000 | Aulph et al. | |
| 6,189,567 B1 | * | 2/2001 | Foltz | B60K 15/03519 137/587 |

(Continued)

FOREIGN PATENT DOCUMENTS

| | | |
|---|---|---|
| DE | 102009036911 A1 | 2/2011 |
| EP | 2511068 A1 | 10/2012 |

*Primary Examiner* — Andrew T Kirsch
(74) *Attorney, Agent, or Firm* — Geoffrey Brumbaugh; McCoy Russell LLP

(57) ABSTRACT

A method for manufacturing a fuel tank is described herein. The method includes subsequent to molding of a housing of a fuel tank, positioning a strut inside the housing. The method additionally includes snap-fitting a flexible projection of the strut with a corresponding flange section in a first wall of the housing, the flange section surrounding an opening in the first wall of the housing and the flexible projection including a surface overlapping an interior surface of the flange section subsequent to the snap-fitting.

15 Claims, 10 Drawing Sheets

(56) References Cited

U.S. PATENT DOCUMENTS

2012/0024868 A1\* 2/2012 Menke .................. B60K 15/03
 220/653
2012/0037638 A1 2/2012 Criel et al.
2016/0067905 A1 3/2016 Criel et al.

\* cited by examiner

REINFORCED FUEL TANK AND METHOD FOR REINFORCED FUEL TANK CONSTRUCTION

CROSS REFERENCE TO RELATED APPLICATION

The present application claims priority to U.S. Provisional Patent Application No. 62/463,522 entitled "Reinforced Fuel Tank and Method for Reinforced Fuel Tank Construction," filed on Feb. 24, 2017. The entire contents of the above-referenced application are hereby incorporated by reference in their entirety for all purposes.

BACKGROUND/SUMMARY

Vehicle fuel tanks can experience large internal pressure variations due to changes in operating conditions within the vehicle as well as external environmental conditions. The pressure variations are often particularly prevalent in hybrid vehicles when compared to vehicles using only combustion engines for propulsion, due to periods of engine inactivity in the hybrid vehicles resulting in increased pressure buildup.

Attempts to address the issues described above include manufacturing fuel tanks with reinforcement to reduce the likelihood of elevated negative or positive pressures having deleterious effects (e.g., fuel tank deformation, rupture, etc.) on the fuel tank housing. One example approach is shown by Criel et al. in U.S. Publication 2012/0037638. Therein, a plastic fuel tank is disclosed having a lower wall, an upper wall, and at least one reinforcing element connecting the two walls, with the reinforcing element comprising a hollow plastic pillar having an opening in its lower part and an opening in its upper part. The openings are situated at locations such that they allow, respectively, the filling of the pillar and the degassing thereof, and at least one part of the hollow pillar is a constitutive element of an accessory that has an active role in the tank.

However, the inventors herein have recognized potential issues with such systems. As one example, fuel tanks including reinforcing columns, such as the fuel tank including the reinforcing element described above with reference to the '638 publication, are often manufactured via complicated manufacturing techniques, which may increase a cost and/or production time of the fuel tanks. In one example, split parison molding processes (sometimes referred to as twin sheet blow molding) have been used to create fuel tanks with columns. However, split parison molding processes have numerous drawbacks, such as a longer cycle time, higher machine cost relative to other fuel tank construction techniques, and manufacturing via specialized machinery that is not readily available in many manufacturing facilities.

In one example, the issues described above may be addressed by a method, comprising: subsequent to molding of a housing of a fuel tank, positioning a strut inside the housing; and snap-fitting a flexible projection of the strut with a corresponding flange section in a first wall of the housing, the flange section surrounding an opening in the first wall of the housing and the flexible projection including a surface overlapping an interior surface of the flange section subsequent to the snap-fitting. In this way, the housing may be pre-molded and reinforced via the snap-fitting in order to reinforce the housing more efficiently and with a lower cost than other manufacturing techniques, such as the split parison process. As a result, a structural integrity of the fuel tank housing can be increased while also increasing the efficiency of the fuel tank manufacturing process, enabling a reduction in the manufacturing cost of the fuel tank and an increase in a durability of the fuel tank.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-8 and 10-12 are shown to scale, though other relative dimensions may be used, if desired.

DETAILED DESCRIPTION

Figure 1:
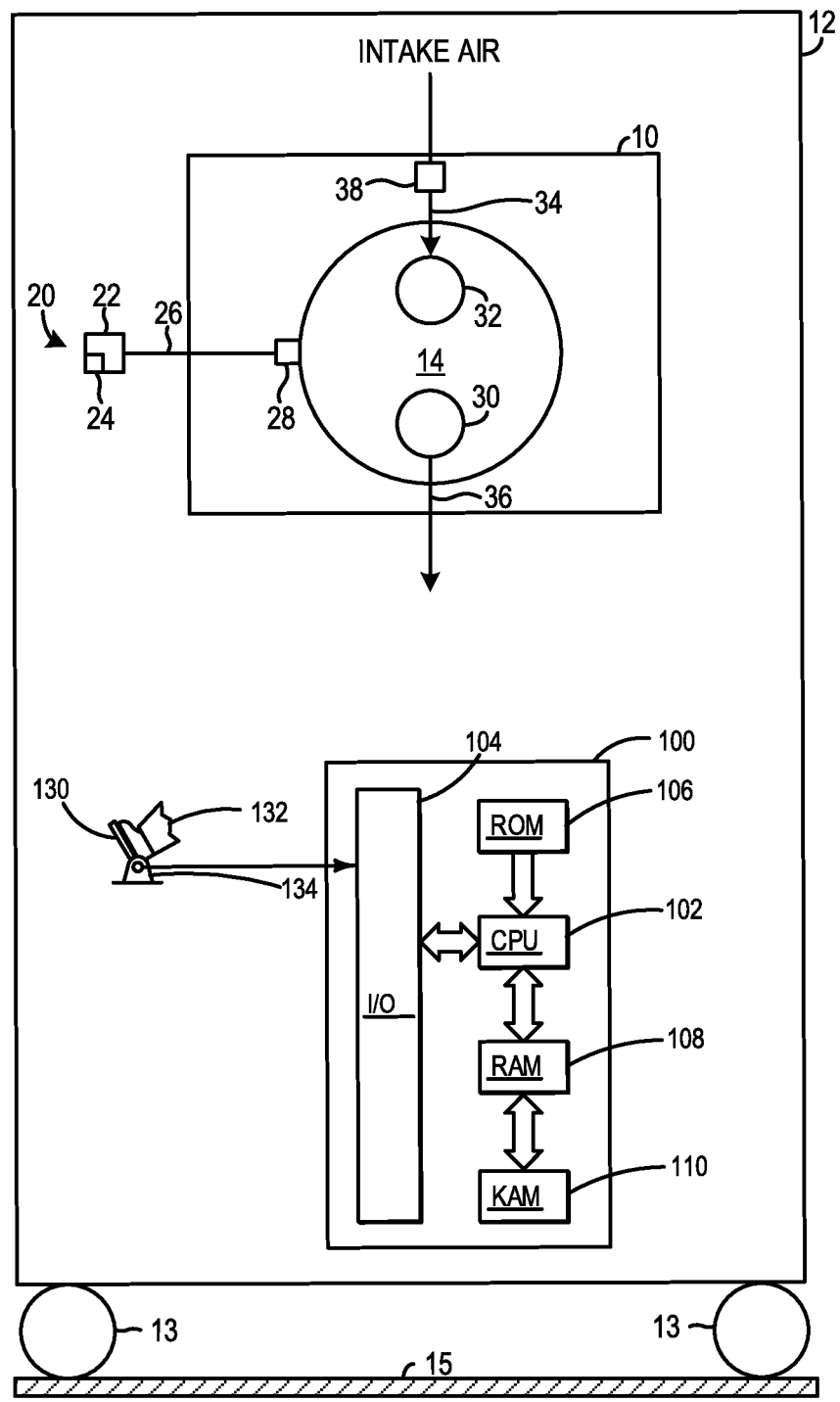
FIG. 1 shows a schematic depiction of an engine with a fuel delivery system.
Figure 2:
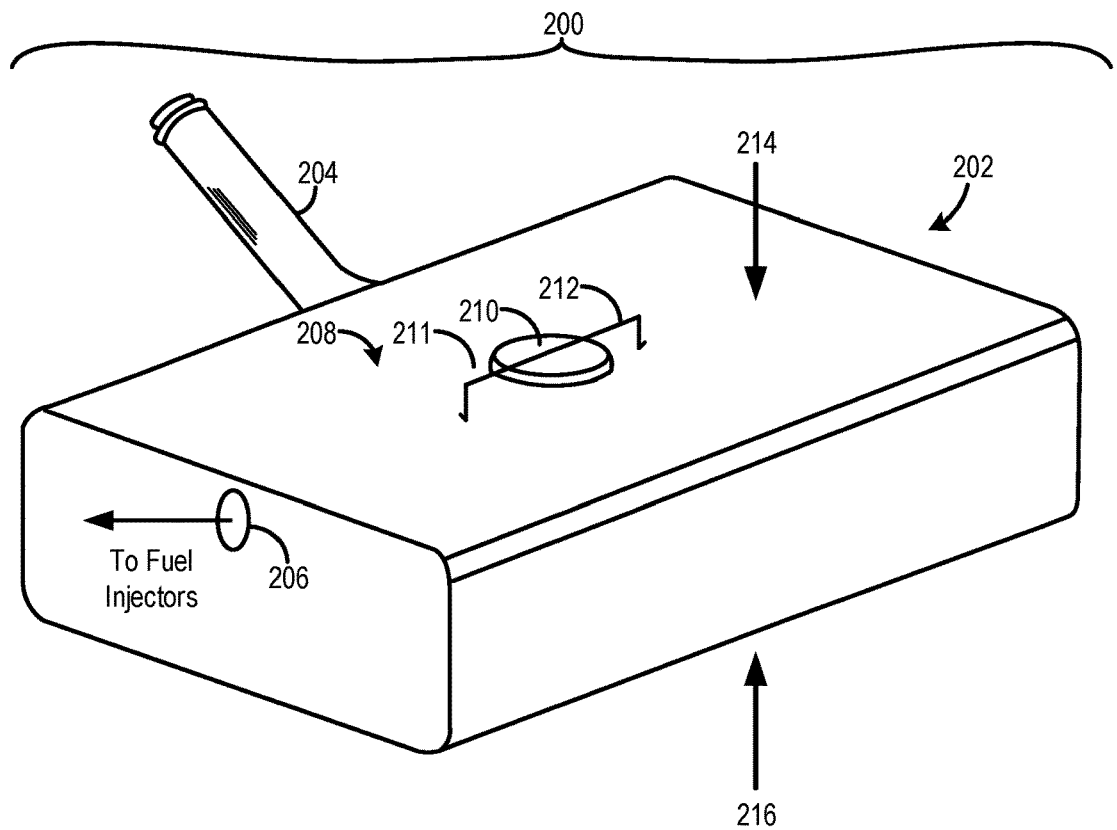
FIG. 2 shows a perspective view of an exemplary fuel tank.
Figure 3:
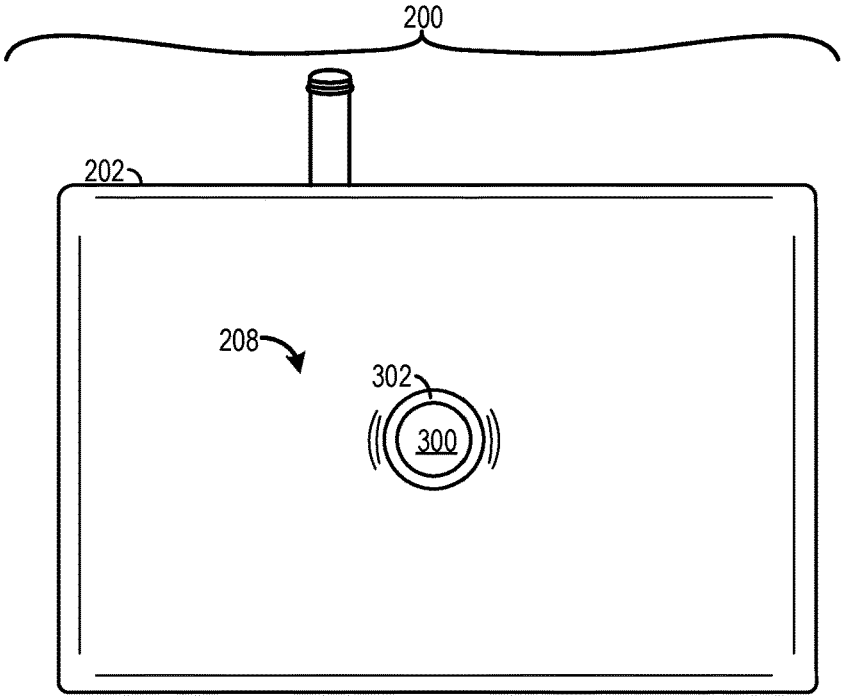
FIG. 3 shows a top view of a housing of the fuel tank, shown in FIG. 2.
Figure 4:
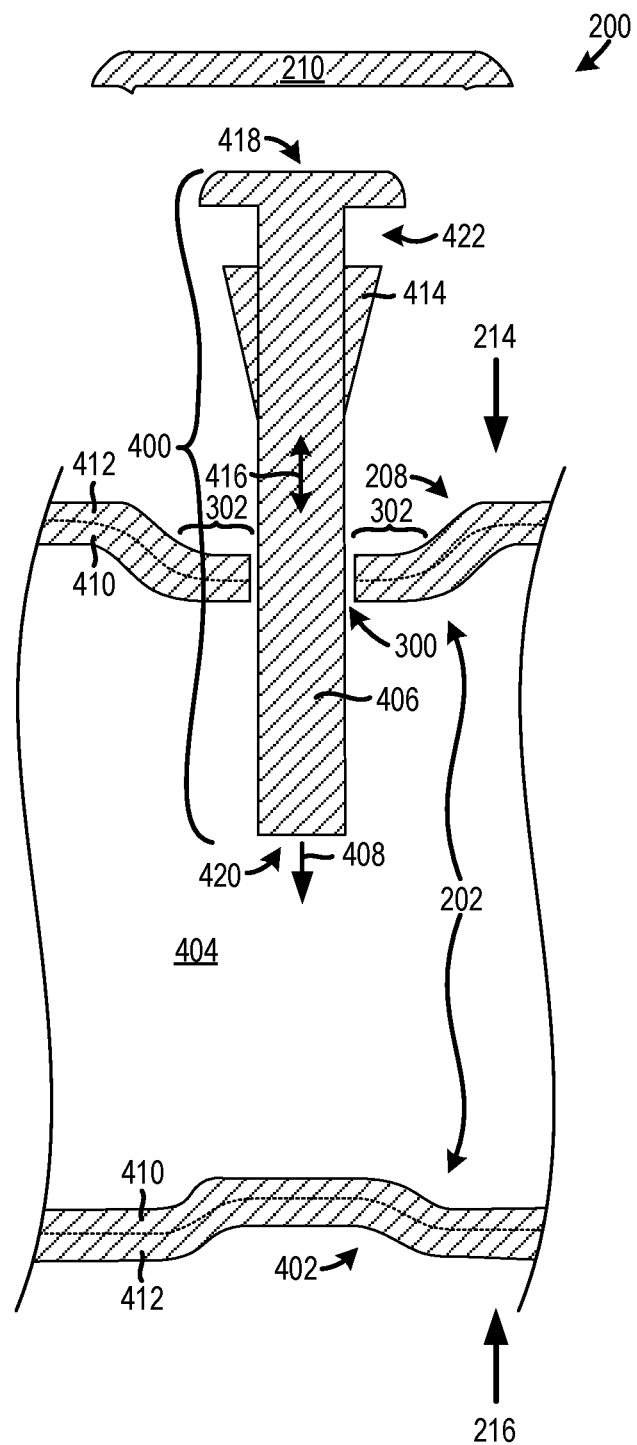
FIGS. 4-6 show a series of cross-sectional views of a portion of the fuel tank shown in FIG. 2, during a fuel tank manufacturing process.
Figure 5:
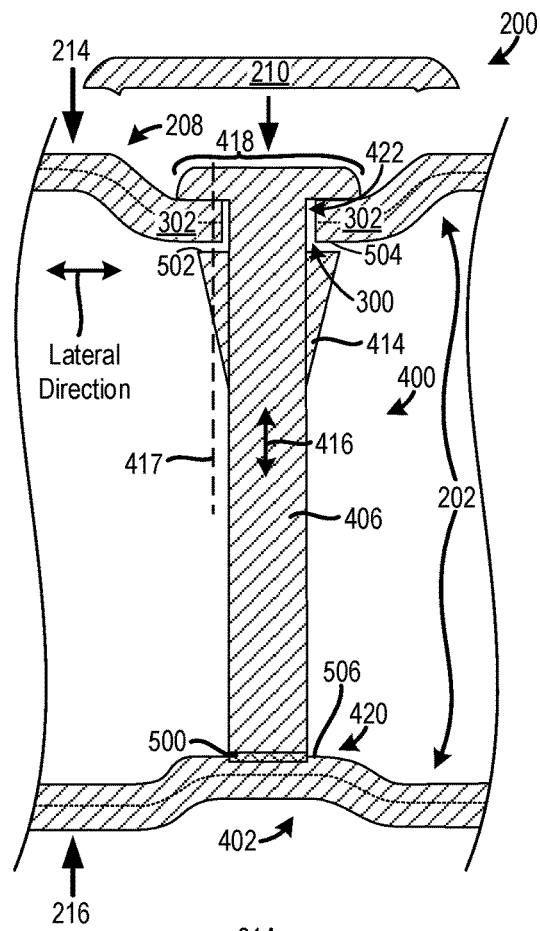
Figure 6:
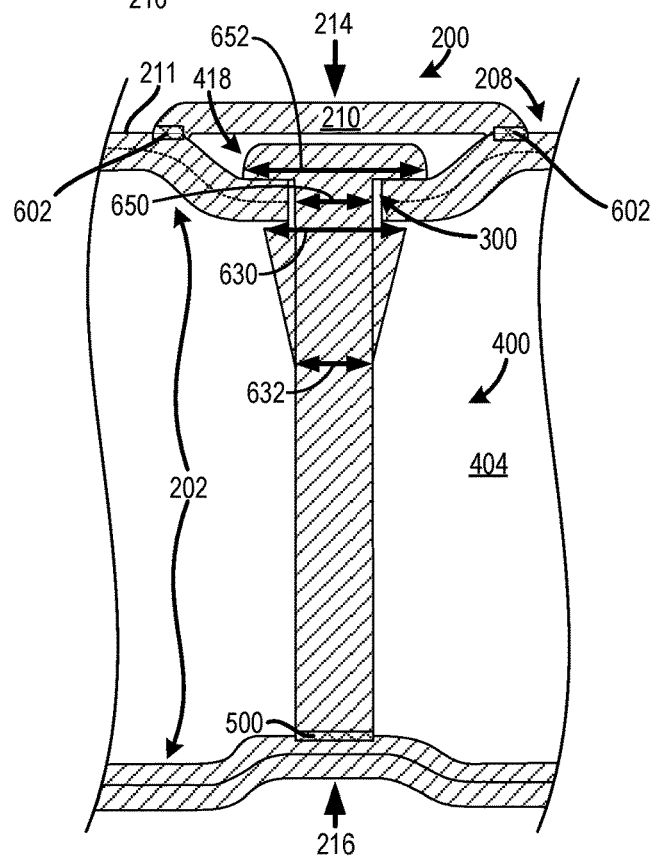
Figure 7:
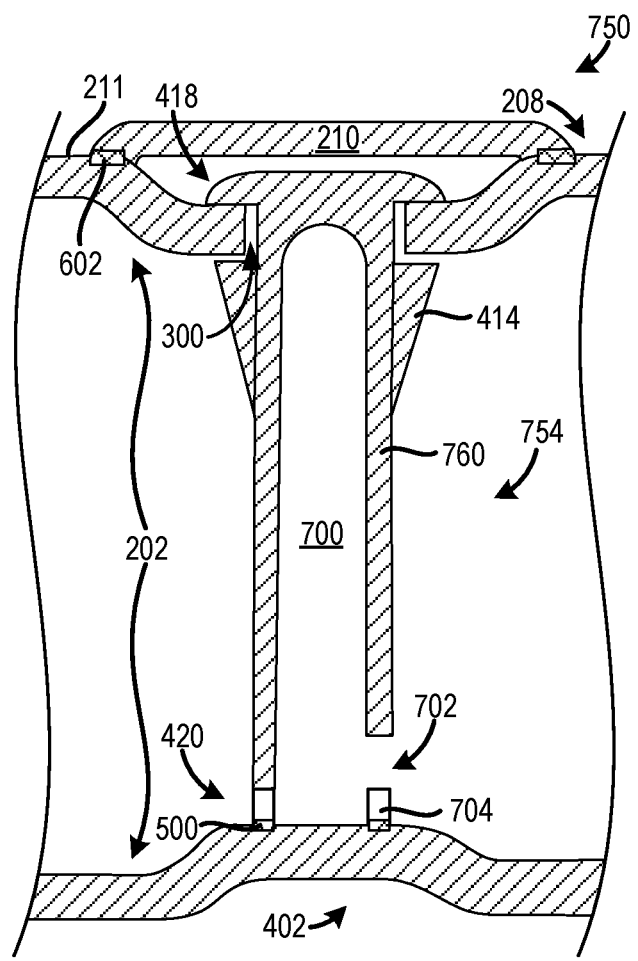
FIG. 7 shows a cross-sectional view of another exemplary fuel tank.
Figure 8:
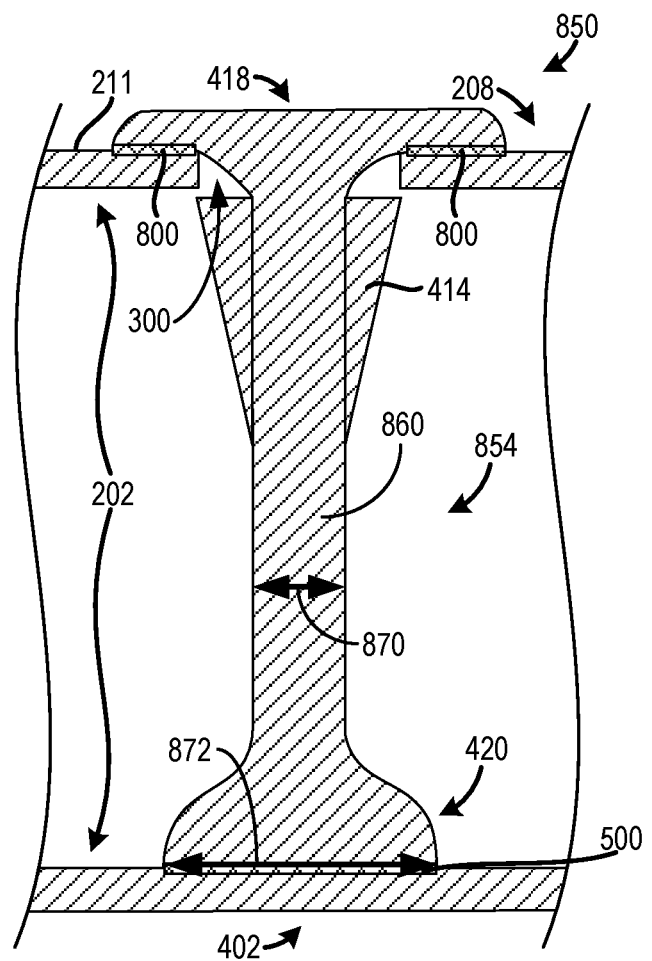
FIG. 8 shows a cross-sectional view of another exemplary fuel tank.
Figure 9:
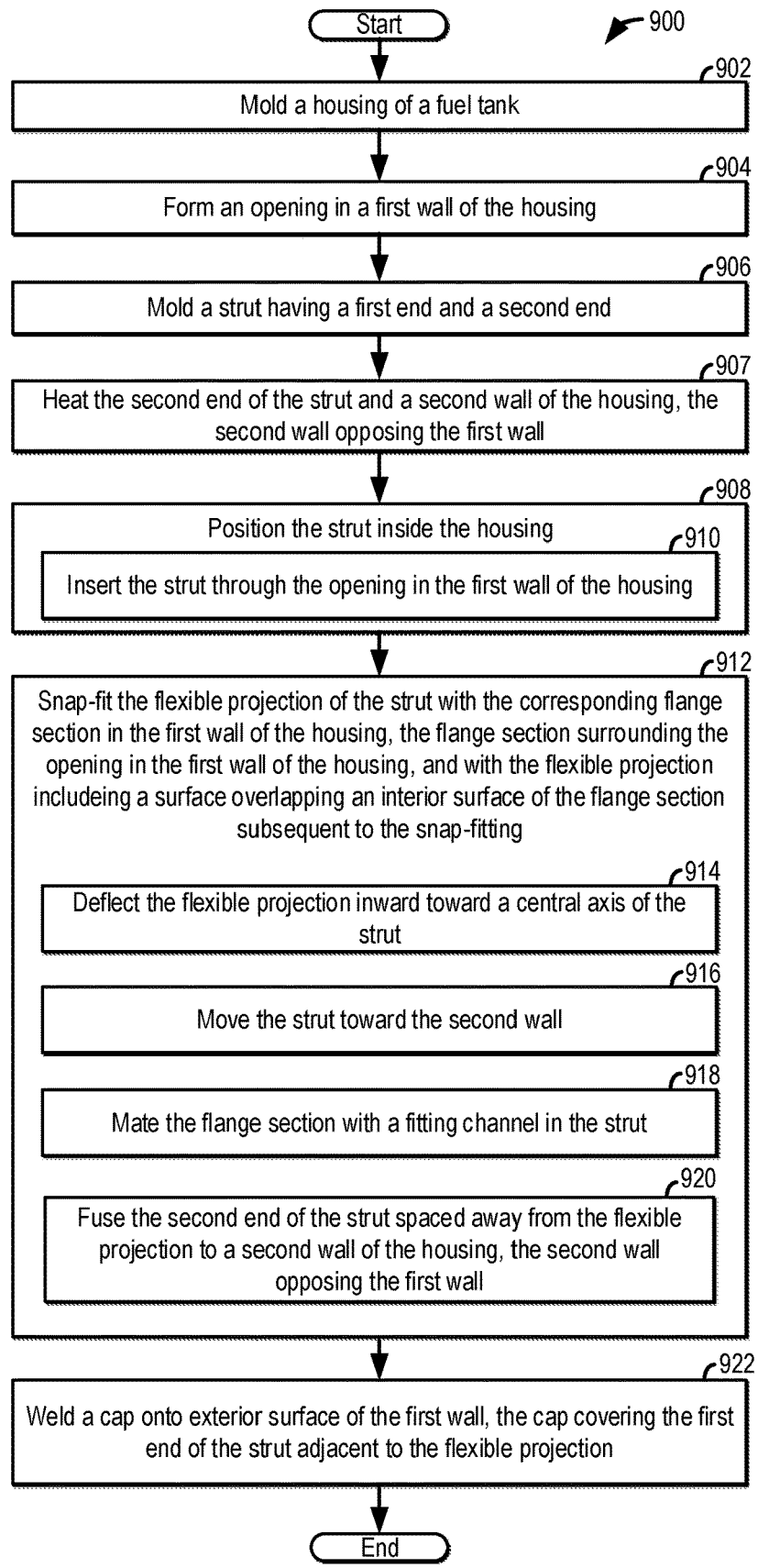
FIG. 9 show a method for manufacturing a fuel tank.
Figure 10:
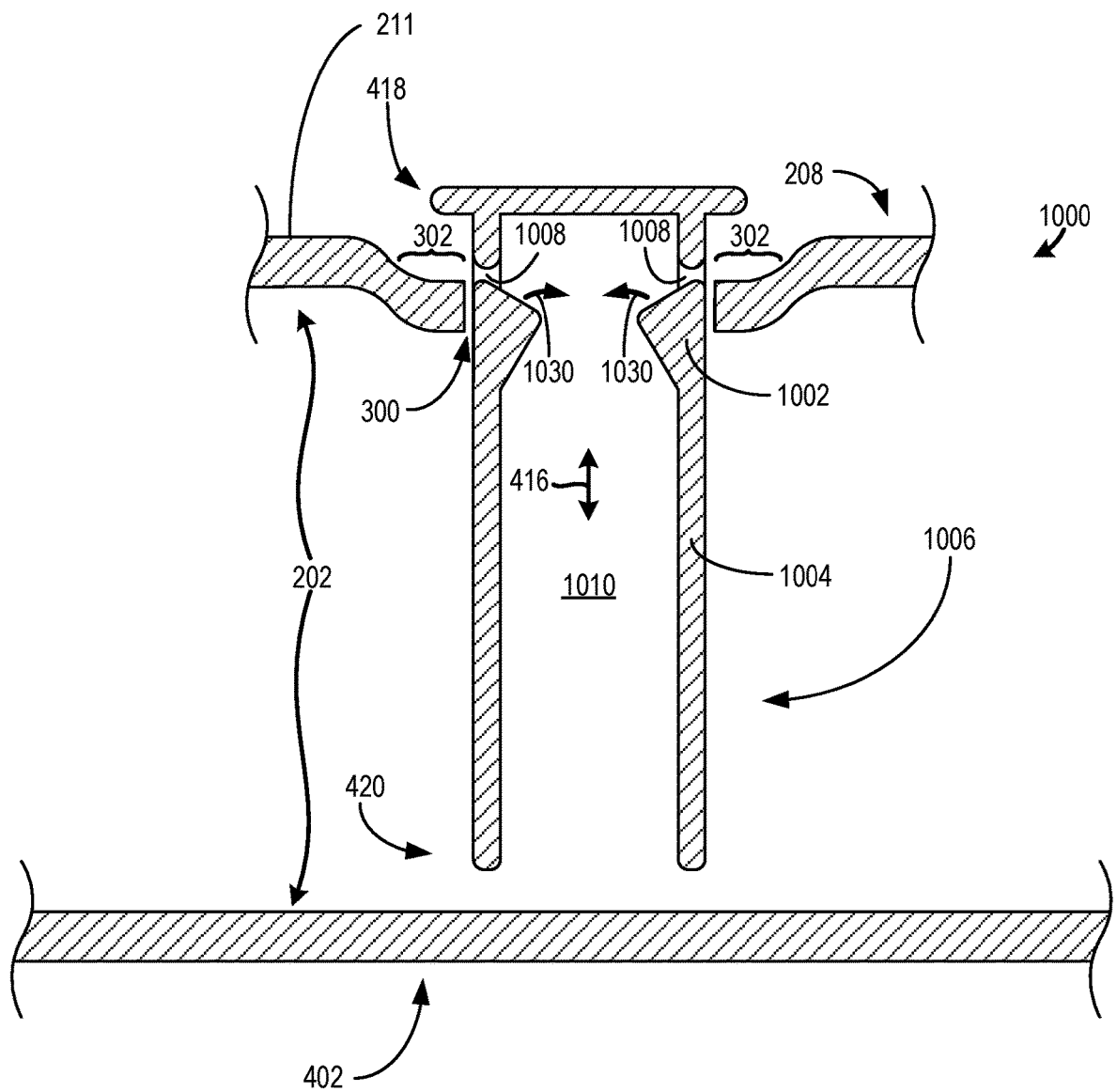
FIGS. 10-11 show additional exemplary fuel tanks.
Figure 11:
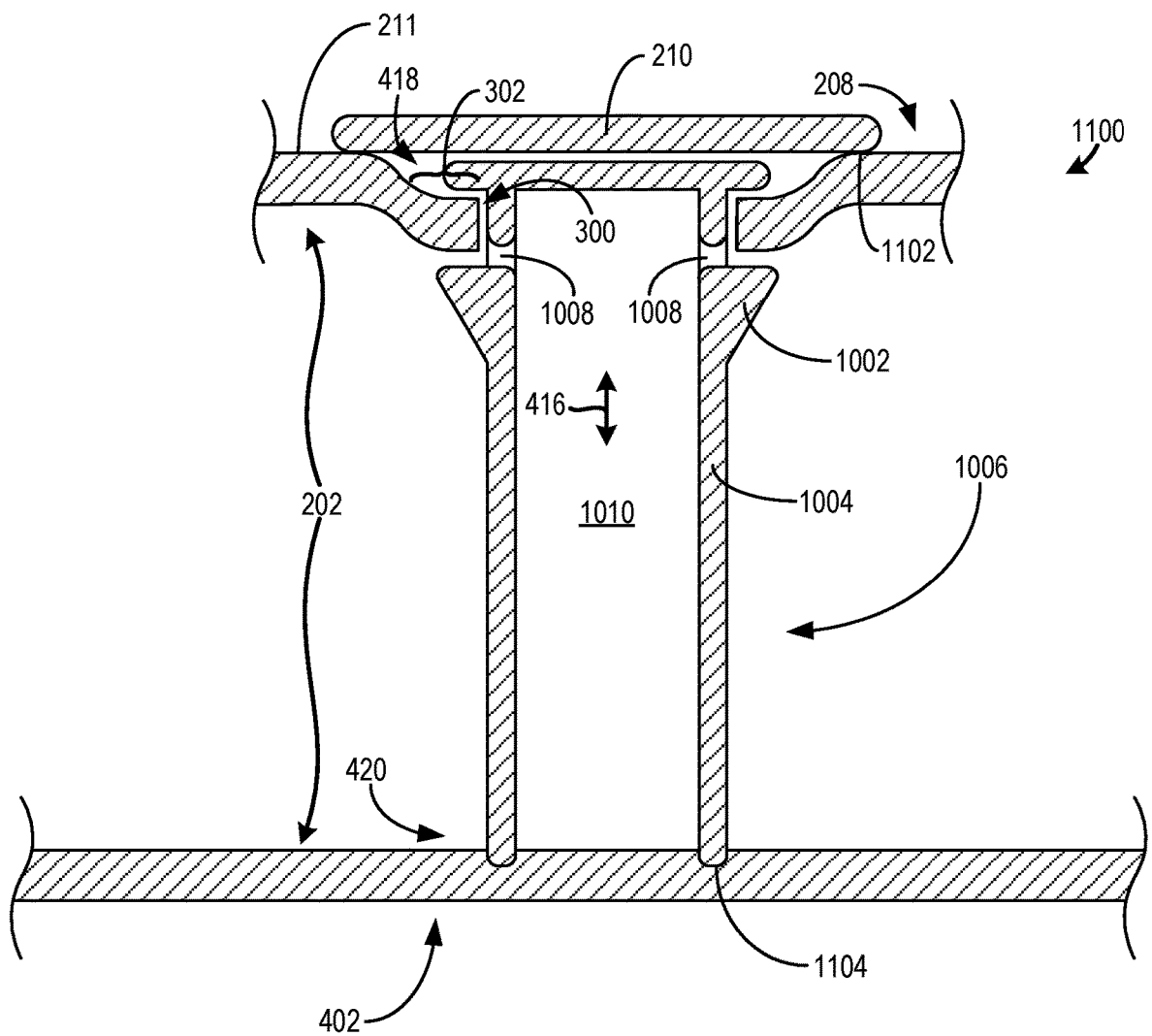
Figure 12:
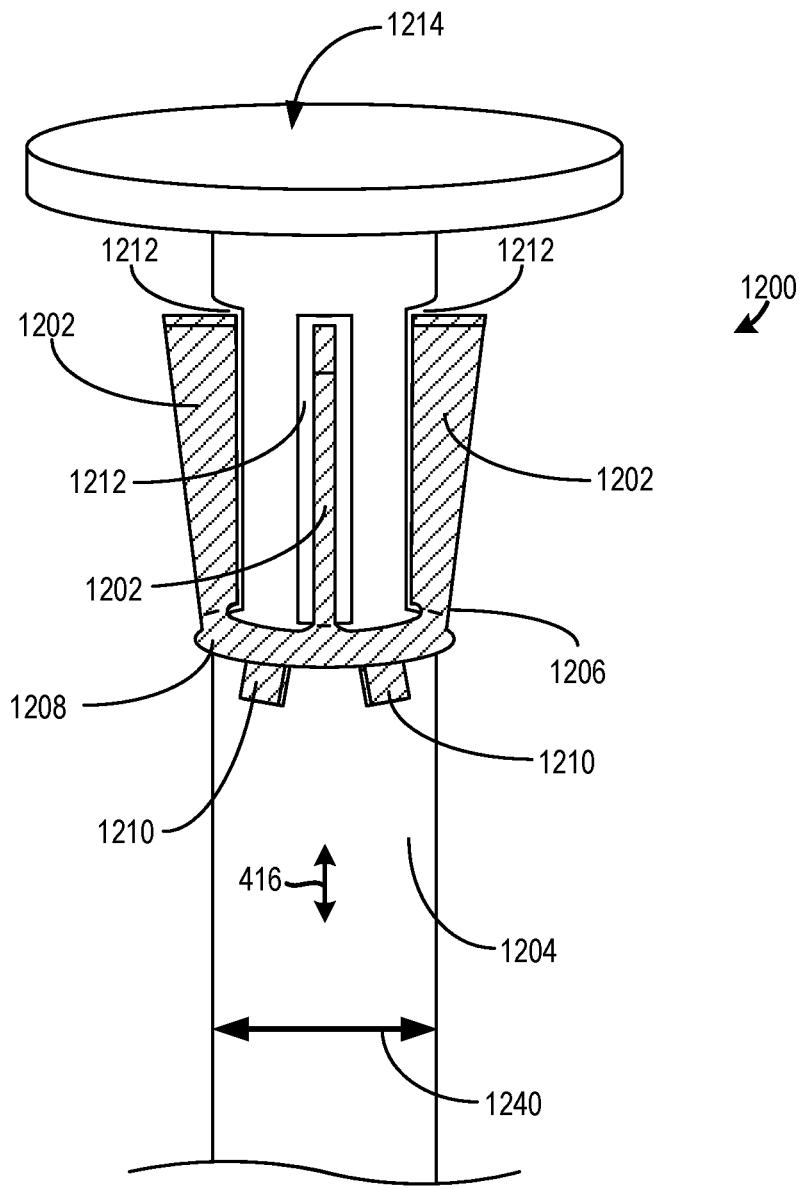
FIG. 12 shows another example of a strut that may be included in a fuel tank.

Methods and systems for constructing a fuel tank with a strut providing fuel tank reinforcement are described herein. The fuel tank construction method includes several steps that can reduce the production cost of the fuel tank while increasing the strength of the fuel tank housing. The method includes snap-fitting a strut with a flange surrounding an opening in a fuel tank housing. The method may also include welding an end of the strut to a wall of the fuel tank. The other end of the strut may be welded to the housing or covered by a cap to seal the fuel tank opening. The snap-fitting and welding processes enable the strut to be efficiently inserted and secured in a desired position in the housing during fuel tank manufacturing. Additionally, the snap-fitting and welding processes may also enable the fuel tank housing to be manufactured using an efficient technique, such as blow molding or rotational molding, as opposed to a split parison molding technique. Consequently, the cost of the fuel tank can be driven down when these manufacturing techniques are employed. The use of the strut in the fuel tank also enables desired regions of the fuel tank to be reinforced to increase fuel tank strength, thereby decreasing the chance of fuel tank deformation, rupture, etc., caused by elevated negative or positive internal tank pressures. Specifically, the strut helps the fuel tank housing resist deflection inward during a vacuum inside the housing and resist deflection of the housing outward while there is positive pressure inside the housing. FIG. 1 shows a schematic depiction of an engine and fuel delivery system, FIG. 2 shows a perspective view of an exemplary fuel tank. FIG. 3 show a top view of the housing of the fuel tank depicted in FIG. 2. FIGS. 4-6 show cross-sectional views of sequential fuel tank manufacturing steps that may be used to construct the fuel tank shown in FIG. 2. FIG. 7 shows a cross-sectional view of a second exemplary fuel tank. FIG. 8 shows a cross-sectional view of a third exemplary fuel tank. FIG. 9 shows a method for manufacturing a fuel tank. FIGS. 10-11 show additional exemplary fuel tanks. FIG. 12 shows another exemplary strut that may be included in a fuel tank.

FIG. 1 shows a schematic depiction of an internal combustion engine 10 in a vehicle 12 with at least one cylinder 14. Engine 10 is controlled by an electronic engine controller 100. In the depicted example, the vehicle 12 is a wheeled road vehicle including wheels 13 in contact with a road 15. However, other types of vehicles other than wheeled vehicles have been contemplated. Additionally, in the depicted example, the road 15 is substantially flat. However it will be appreciated that the vehicle may travel over roads or other surfaces having any type of conceivable profile. Engine 10 includes the cylinder 14 with a piston (not shown) positioned therein and connected to a crankshaft (not shown).

A fuel delivery system 20 configured to provide metered fuel at desired time intervals to the cylinder 14 is included in the vehicle 12. The fuel delivery system 20 includes a fuel tank 22 configured to store fuel (e.g., gasoline, diesel, alcohol, combinations thereof, etc.) The fuel tank 22 is schematically depicted in FIG. 1. However, it will be appreciated that the fuel tank 22 has greater complexity, similar to the examples discussed herein with regard to FIGS. 2-8. The fuel delivery system 20 also includes a fuel pump 24. In the depicted example, the fuel pump 24 is enclosed in the fuel tank 22. It will be appreciated that in other examples the fuel pump 24 may be positioned external to the fuel tank 22. Further in some examples, additional fuel pumps may be included in the fuel delivery system 20. For instance, the fuel delivery system 20 may include a lift pump and a higher pressure fuel pump. However, numerous fuel delivery system pump arrangements have been contemplated. The fuel delivery system 20 also includes a fuel line 26 coupling the fuel tank 22 to a fuel injector 28. The fuel injector 28 is shown coupled to the cylinder 14. Additionally or alternatively a port injector may be included in the engine 10. The fuel delivery system 20 can include additional components that are not depicted in FIG. 1 such as check valves, a fuel rail, a return line, etc.

During operation, each cylinder within engine 10 typically undergoes a four-stroke cycle: the cycle includes an intake stroke, compression stroke, expansion stroke, and exhaust stroke. During the intake stroke, generally, an exhaust valve 30 closes and intake valve 32 opens. Air is introduced into the cylinder 14 via an intake conduit 34 (e.g., intake manifold), and the piston moves to the bottom of the cylinder to increase the volume within cylinder 14. The position at which piston is near the bottom of the cylinder and at the end of its stroke (e.g., when cylinder is at its largest volume) is typically referred to by those of skill in the art as bottom dead center (BDC). During the compression stroke, the intake valve 32 and the exhaust valve 30 are closed. The piston moves toward the cylinder head to compress the air within the cylinder 14. The point at which the piston is at the end of its stroke and closest to the cylinder head (e.g., when cylinder 14 is at its smallest volume) is typically referred to by those of skill in the art as top dead center (TDC). In a process hereinafter referred to as injection, fuel is introduced into the cylinder. In a process hereinafter referred to as ignition, the injected fuel is ignited by known ignition means such as a spark plug or compression, resulting in combustion. During the expansion stroke, the expanding gases push the piston back to BDC. The crankshaft converts piston movement into a rotational torque of the rotary shaft. Finally, during the exhaust stroke, the exhaust valve 30 opens to release the combusted air-fuel mixture to exhaust conduit 36 (e.g., exhaust manifold) and the piston returns to TDC. Note that the above is shown merely as an example, and that intake and exhaust valve opening and/or closing timings may vary, such as to provide positive or negative valve overlap, late intake valve closing, or various other examples. Further, the engine may be a compression ignition engine configured to operate with diesel fuel, for example, and thus during operation ignition via spark plug may be dispensed with.

The engine 10 also includes a throttle 38 configured to adjust the amount of air provided to the cylinder 14 through the intake conduit 34 via the intake valve 32. Additional components may be included in the engine 10 such as additional conduits, a compressor, an intake manifold, etc., that assist in providing intake air to the cylinder and/or provide other useful functions such as providing boost, cooling, etc.

Controller 100 is shown in FIG. 1 as a conventional microcomputer including: microprocessor unit 102, input/output ports 104, read-only memory 106, random access memory 108, keep alive memory 110, and a conventional data bus. Controller 100 is configured to receive various signals from sensors coupled to engine 10. The controller 100 may also be configured to trigger one or more actuators in the engine 10 and specifically the fuel delivery system 20. For instance, the controller 100 may be configured to adjust the throttle 38, fuel injector 28, fuel pump 24, etc. Therefore, the controller 100 receives signals from the various sensors of FIG. 1 and employs the various actuators of FIG. 1 to adjust engine operation based on the received signals and instructions stored in memory of the controller.

Engine 10 may be controlled at least partially by a control system including controller 100 and by input from a vehicle operator 132 via an input device 130. In this example, input device 130 includes an accelerator pedal and a pedal position sensor 134 for generating a proportional pedal position signal PP.

FIG. 2 shows a perspective view of a fuel tank 200. It will be appreciated that the fuel tank shown 200 in FIG. 2 may be an exemplary detailed representation of the fuel tank 22 in the fuel delivery system 20 shown in FIG. 1.

FIG. 2 shows a housing 202 of the fuel tank 200. The housing 202 is configured to enclose (e.g., store) a fuel (e.g., gasoline, diesel, alcohol, combinations thereof, etc.). The fuel tank 200 further includes an input port 204 (e.g., filler conduit) configured to receive fuel. The input port 204 may include different parts such as valves, venting conduits, etc., that facilitate filling of the housing 202 with fuel.

The fuel tank 200 further includes an output port 206 configured to couple the fuel tank 200 to fuel injectors via a fuel line (e.g., fuel injector 28 and fuel line 26 shown in FIG. 1). In this way, the fuel tank 200 can receive fuel as well as deliver fuel to desired components in the fuel delivery system including the fuel tank 200 (e.g., fuel delivery system 20 shown in FIG. 1). As previously discussed, a fuel pump (e.g., the fuel pump 24 shown in FIG. 1) may be integrated within the fuel tank 200 or may be positioned at a downstream location with a pick-up conduit extending into the fuel tank 200. As such, the output port 206 may be positioned downstream and/or upstream of the fuel pump.

Continuing with FIG. 2, the fuel tank 200 includes first wall 208 having a cap 210 coupled thereto. In the depicted example, the cap 210 is welded to an exterior surface 211 (which may be referred to herein as an outer surface) of the first wall 208. However, in other examples, the cap 210 may be omitted from the fuel tank 200. Cutting plane 212 defines the cross-section of the view of the assembled fuel tank 200 shown FIG. 6. However, it will be appreciated that the cross-sections illustrated in FIGS. 4-5 are also viewed from a similar perspective during different fuel tank manufacturing steps.

FIG. 3 shows a top view of the housing 202 of the fuel tank 200 with the cap 210 removed. The housing 202 includes an opening 300 surrounded by a flange section 302 of the first wall 208. In one example, opening 300 may be formed in the first wall 208 during molding (e.g., blow molding) of the fuel tank 200. During conditions in which the cap 210 is welded to the exterior surface 211, the cap 210 blocks (e.g., seals) the opening 300. Prior to welding the cap 210 to the exterior surface 211, a strut, described in greater detail herein, may be inserted into the opening and subsequently snap-fit with the flange section 302.

FIGS. 4-6 shows a series of cross-sectional views of a portion of the fuel tank 200 along cutting plane 212, where a strut 400 is installed in the housing 202 through sequential manufacturing steps that enable efficient and low cost fuel tank manufacturing while providing a desired amount of reinforcement to a selected region of the fuel tank.

Turning now specifically to FIG. 4, it shows a cross-sectional view along cutting plane 212 of FIG. 2 of the fuel tank 200. The housing 202 of the fuel tank 200 in the view shown by FIG. 4 has been pre-molded or otherwise constructed. In one example, the housing 202 may be blow molded or rotational molded (e.g., formed by rotational molding). It will be appreciated that blow molding and rotational molding are each more efficient and lower cost processes than other molding techniques such as split parison molding. Additionally, the strut 400 and the cap 210 also have been previously molded or otherwise constructed. In one example, the housing 202, strut 400, and/or cap 210 may be blow molded. Specifically, the housing 202 may be blow molded separately relative to the strut 400 and cap 210. For example, housing 202 may be blow molded as a first part, strut 400 may be blow molded as a separate, second part, and cap 210 may be blow molded as a separate, third part. The strut 400 and cap 210 may then be coupled to the housing 202 as described herein in order to form the fuel tank 200. However, other types of molding for the housing, strut, and/or cap have been contemplated such as injection molding, overmolding, etc. Specifically, in one example, the strut 400 may be injection molded or overmolded, and the cap may be injection molded, or may be cut or punched from co-extruded stock as a multi-layer product.

The housing 202 includes first wall 208 and an opposing, second wall 402. The first wall 208 and the second wall 402 are positioned on opposing sides of the fuel tank 200 (e.g., top side 214 and bottom side 216, respectively). Additionally, the first wall 208 includes the flange section 302 surrounding the opening 300, as previously discussed. In one example, the opening 300 may be formed via a boring process (e.g., chipless boring process) in which a drill cuts through the first wall 208. However, in other examples the opening 300 may be formed while the housing 202 is molded, as described above.

In FIG. 4, the strut 400 is being positioned within an interior compartment 404 of the housing 202, with the interior compartment 404 configured to store fuel within the housing 202 as described above. Specifically, a shaft 406 (e.g., central shaft) is shown being inserted through the opening 300 in the housing 202 in a downward direction 408 (e.g., a direction from top side 214 to bottom side 216). In one example, the direction 408 may be parallel to a vertical axis when the vehicle in which the fuel tank is incorporated is on a level surface. However, other fuel tank orientations have been contemplated.

Additionally, it will be appreciated that the first wall 208 and the second wall 402 may include two layers 410 and 412. Each of the layers 410 and 412 may be constructed out of different materials, in one example. For instance, the inner layer may be constructed out of a plastic material that is capable of having the strut 400 welded thereto while the outer layer may be constructed out of another type of material, which may be stronger, in some examples. However, in other examples the first and second walls may include a single layer (e.g., a single layer in place of the inner and outer layers). The single layer may be formed of a single material or may be a composite of one or more materials (e.g., fiberglass-embedded thermoplastic, ethylene vinyl alcohol [EVOH], adhesives, and/or carbon fiber embedded plastics). Furthermore, it will be appreciated that the others walls in the housing may also have a single or multilayer construction similar to those described above.

The housing 202 and the strut 400 may each include a corresponding plastic material that enables the strut to be welded to the housing. For instance, both the housing 202 and the strut 400 may be constructed out of polyethylene (e.g., high density polyethylene), for instance. In one example, the inner layer 410 and the strut 400 may each be formed of polyethylene, such that the strut 400 may be fused (e.g., welded) to the inner layer 410 toward the bottom side 216 of the fuel tank 200 (e.g., as shown by FIGS. 5-6 and described below).

The strut 400 includes a flexible projection 414 (e.g., protrusion) extending away from a central axis 416 of the strut 400 (e.g., extending radially outward relative to the central axis 416, as shown by FIGS. 4-6). The strut 400 additionally includes a first end 418 and a second end 420, the first end and the second end positioned on opposing sides of the strut along the central axis 416. Additionally, the strut 400 includes a fitting channel 422 (which may be referred to herein as a strut channel) positioned between the first end 418 and the flexible projection 414. The flange section 302 of the first wall 208 is also shown in FIG. 4. Additionally, the cap 210 is shown in FIG. 4 in an uninstalled position (e.g., decoupled from the housing 202).

FIG. 5 shows a subsequent step in the fuel tank manufacturing process following the configuration shown by FIG. 4 (e.g., after inserting the strut 400 into the interior compartment 404 of the housing 202). Specifically, FIG. 5 shows the strut 400 after the flexible projection 414 of the strut 400 is snap-fit with the flange section 302 of the first wall 208. In one example, the flexible projection 414 may circumferentially surround the shaft 406 (e.g., extend around an entire outer perimeter of the shaft 406 in a direction around the central axis 416). However, in other examples the flexible projection may only extend around a portion of the shaft 406 (e.g., extend only around a portion of the outer perimeter in the direction around the central axis 416). In yet another example, multiple flexible projections may be included in the strut that are spaced apart from one another. For instance, two flexible projections may be provided in the strut that are separated by 180 degrees around the central axis 416. In yet another example, the strut may include two sets of flexible projections (e.g., for a total of four flexible projections), with each set having two flexible projections that are separated by 180 degrees around the central axis 416 (e.g., such that each flexible projection is separated from each adjacent flexible projection by an angle of 90 degrees around the central axis 416). In further examples, one or more of the flexible projections may be positioned away from one or more adjacent struts by a different number of degrees (e.g., 30 degrees) around the central axis 416 relative to each other flexible projection of the strut 400.

Snap-fitting the flexible projection 414 with the flange section 302 may include deflecting the flexible projection 414 inward toward the central axis 416 of the strut 400, moving the strut 400 toward the second wall 402 (e.g., in a direction from the top side 214 toward the bottom side 216), and mating the flange section 302 with the fitting channel 422. For example, the flange section 302 may have a thickness enabling the flange section 302 to fit within the fitting channel 422. When the flange section 302 is mated with the fitting channel 422, a portion of the flange section extends into the fitting channel. Additionally, the shaft 406 extends across (e.g., laterally across, in an outward radial direction of the central axis 416) a portion of the opening 300 when the flange section 302 is mated with the fitting channel 422. The mating between the fitting channel 422 and the flange section 302 enables the strut 400 to be secured to the housing 202 in a desirable location. For example, opening 300 and flange section 302 may be positioned at a location of the housing 202 in which reinforcement of the housing 202 is desirable (e.g., in order to increase a deflection resistance of the housing 202 at the location of the opening 300 and flange section 302 via the strut 400).

Additionally, when the flange section 302 is mated with the fitting channel 422, a surface 502 (e.g., lateral surface) of the flexible projection 414 overlaps an interior surface 504 of the flange section 302 (e.g., the interior surface formed by inner layer 410 within the interior compartment 404). Specifically, the surface 502 of the flexible projection 414 is positioned parallel to the interior surface 504 and is aligned with the interior surface 504 in a direction parallel with the central axis 416 (e.g., the direction of insertion of the strut 400 into the interior compartment 404). Further, the surface 502 is positioned relative to the interior surface 504 such that an axis 417 offset from the central axis 416 in a radial direction of the central axis 416 and positioned parallel with the central axis 416 intersects each of the surface 502 and the interior surface 504. In this configuration, attempts to move the strut 400 in a direction away from the bottom side 216 after the flange section 302 has mated (e.g., engaged) with the fitting channel 422 result in the surface 502 pressing against the interior surface 504, preventing the strut 400 from being removed from the interior compartment 404 such that the strut 400 is locked to the housing 202 by the flexible projection 414. The overlapping of surface 502 and the interior surface 504 is in a lateral direction (e.g., radial direction of the central axis 416), in the depicted example. However, other orientations of the overlap of the surface 502 and the interior surface 504 have been contemplated.

To enable the deflection of the flexible projection 414 (e.g., during insertion of the strut 400 into the interior compartment 404), the flexible projection may include a compliant material that can be compressed, such as a deformable plastic (e.g., polyamide 11, an elastomer). In another example, the flexible projection may be constructed out of a metal. In yet another example, the strut may be constructed out of a solid plastic and the flexible projection may be a thin fin that wrinkles upon insertion, but regain its shape and supports the wall after insertion is completed (e.g., with the 502 of the flexible projection overlapping the interior surface 504, as described above). In such an example, the flexible projection 414 may include a different material than the shaft 406, the first end 418, and/or second end 420 of the strut 400. For example, the shaft 406, first end 418, and second end 420 may be constructed of a first material (e.g., polyethylene), and the flexible projection may be constructed of a different, second material (e.g., flexible metal). However, in other examples, the flexible projection 414 and the shaft 406 may be constructed out a similar material.

As shown in FIG. 5, the flexible projection 414 tapers in a direction from the first end 418 toward the second end 420 of the strut 400. Specifically, a first width 630 of the flexible projection 414 at the first end 418 is greater than a second width 632 of the flexible projection 414 at the second end 420. The tapered geometry of the flexible projection 414 as described above enables a compression force pressing the projection inward (e.g., as a result of the flexible projection 414 being pressed against the flange section 302) to be steadily increased as the strut 400 is inserted through the opening 300. As a result, the strut can be smoothly snap-fit with the flange section 302 (e.g., with the flange section 302 being positioned within the fitting channel 422 after an entirety of the flexible projection 414 is inserted into the interior compartment 404). Specifically, as the strut 400 is inserted into the interior compartment 404, the flexible projection 414 is pressed against the flange section 302, compressing the flexible projection 414. However, after an entirety of the flexible projection 414 is positioned within the interior compartment 404, the flexible projection 414 may expand and return to its original, uncompressed shape, locking the strut 400 to the housing 200. Although the shape of the flexible projection 414 is described above, other geometries of the flexible projection 414 have been contemplated. For instance, the outer surface of the flexible projection 414 may be curved along an axial direction of the central axis 416, in another example.

Additionally FIG. 5 shows the second end 420 of the strut 400 welded to the second wall 402. The weld 500 is depicted by FIG. 5. In this way, the strut 400 can be securely fastened to the housing 202. In some examples, a hot plate welding technique may be used to attach (e.g., weld) the second end 420 of the strut 400 to an interior surface 506 of the second wall 402. For example, hot plate welding may be utilized in order to heat both of the second end 420 and the interior surface 506 prior to pressing the second end 420 and the interior surface 506 together in order to fuse the interior surface 506 with the second end 420 of the strut 400. It will be appreciated that welding is a process where two materials are joined via fusion (e.g., via melting and mixing of the material of the second end 420 of the strut 400 with the material of the interior surface 506).

The second end 420 of the strut 400 may be welded to the interior surface 506 following insertion of the strut 400 into the interior compartment 404 and locking of the strut 400 within the interior compartment 404 by the flexible projection 414 (as described above). Specifically, strut 400 and interior surface 506 may be heated as described above, and strut 400 may be inserted into the interior compartment 404 as described above. The flexible projection 414 is compressed by the flange section 302 as the flexible projection 414 presses against the flange section 302, and the flexible projection 414 expands to return to its uncompressed shape after the entirety of the flexible projection 414 is positioned within the interior compartment 404. The second end 420 of the strut 400 is then welded to the interior surface 506 (e.g., due to the increased temperature of each of the second end 420 of the strut 400 and the interior surface 506 while the second end 420 is pressed against the interior surface 506) to secure the second end 420 to the housing 202 (e.g., maintain a position of the second end 420 within the interior compartment 404).

As shown in the example depicted in FIG. 5, the second end 420 of the strut 400 is in contact with the second wall 402 (e.g., the interior surface 506), and the first end 418 may be in contact with the first wall 208 (e.g., interior surface 504). Thus, the strut 400 extends from the first wall 208 to the second wall 402 (e.g., across the interior compartment 404 in a direction from the top side 214 to the bottom side 216, between the first wall 208 and the second wall 402). Furthermore, the cap 210 is also shown in FIG. 5 in an uninstalled position (e.g., a position in which the cap 210 is not coupled to the housing 202 or the strut 400).

FIG. 6 shows another step in the fuel tank manufacturing process, following the step illustrated by FIG. 5. As shown in FIG. 6 the cap 210 is welded to exterior surface 211 (which may be referred to herein as an outer surface) of the first wall 208. The weld 602 is depicted in FIG. 6. The cap 210 laterally extends across the first end 418 of the strut 400, in the depicted example (e.g., in the radial direction of the central axis 416). In this way, the cap 210 seals the opening 300 to prevent liquid fuel and vapor from escaping from the interior compartment 404 (e.g., from flowing from the interior compartment 404 to atmosphere). However, in other examples, the cap 210 may be omitted from the fuel tank 200, and the first end 418 of the strut 400 may instead be welded to the exterior surface 211 of the first wall 208 of the housing 202. For example, a width 652 of the first end 418 of the strut 400 may be greater than a diameter 650 of the opening 300. The first end 418 may be positioned in face-sharing contact with the flange section 302 encircling the opening 300 and may be fused (e.g., welded) to the flange section 302, sealing the opening 300.

Additionally, it will be appreciated that the position of the strut 400 may be altered, in other examples. For instance, in a saddle shaped fuel tank, the strut 400 may be positioned in the saddle region. It will also be appreciated that in other embodiments, a plurality of struts may be included in the fuel tank. The struts may be incorporated into the fuel tank in a similar manner to the strut 400 and may or may not have geometries similar to the strut 400. For instance, the geometry of the struts may be designed based on the desired end-use fuel tank characteristics. For instance, a first strut may have a larger diameter than a second strut to provide increased structural integrity in a selected tank region.

FIG. 7 shows another exemplary fuel tank 750. The fuel tank 750 shares many similarities with the fuel tank 200 shown in FIGS. 2-6, and may be an example of the fuel tank 22 shown by FIG. 1 and described above. As such, similar parts are labelled accordingly and repeated description of elements of the fuel tank may be omitted.

The fuel tank 750 shown in FIG. 7 includes a strut 754. Strut 754 includes several components similar to those described above with reference to strut 400. Similar components are labelled similarly and may not be re-introduced. Strut 754 includes a hollow interior section 700 and an opening 702 enabling fuel to flow into the hollow interior section, thereby increasing the fuel storage capacity of the fuel tank 200. Additionally, a portion 704 of the second end 420 of the strut 754 may be constructed out of a different material than other sections (e.g., a different material than the first end 418, shaft 760, the flexible projection 414, etc.) of the strut 754, or in some examples, a different material than the remainder of the strut. The material used to construct the portion 704 of the strut 754 may be a polyethylene material (e.g., high density polyethylene) while other sections of the strut 754 may be constructed out of polyphthalamide and/or polyoxymethylene, for example. Using a varied material construction of the strut 754 may enable the second end 420 of the strut 754 to be welded to the second wall 402 of the housing 202, while increasing a structural integrity (e.g., strength) of other portions of the strut 754. The weld 500 joining the second end 420 of the strut 754 to the second wall 402 is shown in FIG. 7. FIG. 7 also shows the weld 602 joining the cap 210 to the exterior surface 211 of the first wall 208 of the housing 202.

FIG. 8 shows another exemplary fuel tank 850. The fuel tank 850 shares many similarities with the fuel tank 200 shown in FIGS. 2-6 and the fuel tank 750 shown by FIG. 7. As such, similar parts are labelled accordingly and repeated description of elements of the fuel tank may be omitted. Further fuel tank 850 includes strut 854, with several elements of the strut 854 being similar to those described above with reference to strut 400 and strut 754. As such, similar elements may be labeled similarly and may not be re-introduced.

FIG. 8 shows the fuel tank 850 without a separate cover (e.g., cap 210) extending across the first end 418 of the strut 400. As shown in the depicted example, the first end 418 is welded to the exterior surface 211 of the first wall 208 of the housing 202. This weld 800 is shown in FIG. 8. In the configuration shown by FIG. 8, the first end 418 seals opening 300 of the housing 202.

FIG. 8 also illustrates the second end 420 of the strut 854 having a diameter 872 greater than a diameter 870 of shaft 860. Consequently, the strength of the weld 500 between the second end 420 and the second wall 402 of the housing 202 can be increased, thereby increasing the structural integrity of the fuel tank 200. For example, a surface area of the weld 500 may be increased due to the increased diameter 872 of the second end 420 of the strut 854 relative to other portions of the strut 854 (e.g., shaft 860).

FIG. 9 shows a method 900 for manufacturing a fuel tank. The method 900 may be used to manufacture the fuel tanks described herein with regard to FIGS. 1-8 and FIGS. 10-12 or may be used to construct other suitable fuel tanks.

At 902, the method includes molding a housing of a fuel tank. The housing (e.g., housing 202) may include a number of walls (e.g., first wall 208, second wall 402, etc.) enclosing an interior compartment (e.g., interior compartment 404) of the fuel tank that is configured to store a fuel (e.g., gasoline or diesel fuel). As previously discussed with reference to the examples provided above, the housing of the fuel tank may be blow molded, in some examples.

At 904, the method may include forming an opening into a first wall of the housing of the fuel tank. For instance, a drill press may be used to bore the opening (e.g., opening 300) in the first wall. The opening is surrounded by a flange section (e.g., flange section 302) of the first wall. In other examples as described above, the opening in the housing may instead be formed during molding of the housing and may not be bored into the housing after the molding.

The method continues from 904 to 906 where the method includes molding a strut. The strut (e.g., strut 400, strut 754, and/or strut 854) includes a first end and a second end (e.g., first end 418 and second end 420, respectively) connected (e.g., coupled) to a shaft (e.g., shaft 406, strut 760, and/or strut 860). The strut may also include a flexible projection (e.g., flexible projection 414) extending in a direction away from the shaft (e.g., the radial direction of central axis 416 as described above), with the flexible projection being adjacent to the first end. Additionally, the strut may include a fitting channel (e.g., fitting channel 422) positioned between the first end and the flexible projection.

The method continues from 906 to 907 where the method includes heating the second end of the strut and a second wall of the housing, the second wall opposing the first wall. For example, a hot plate welding machine may provide heat to each of the second end of the strut and the second wall of the housing in order to increase a temperature of the second end of the strut and the second wall (e.g., prior to fusing the strut to the second wall, as described at 920). Heat may be provided to each of the strut and the second wall separately (e.g., during conditions in which the strut is not coupled to the second wall). The temperature of each of the second end of the strut and the second wall may be increased above a threshold temperature (e.g., in order to sufficiently soften the second end of the strut and the second wall prior to joining the second end of the strut to the second wall). The increased temperature of the second end of the strut and the second wall of the housing may be maintained throughout manufacturing of the fuel tank (e.g., maintained until the strut is assembled with the housing as described below). For example, steps described below with reference to manufacturing the fuel tank (e.g., 908, 912, etc.) may occur within a sufficiently short amount of time to enable the temperature of the second end of the strut and the second wall of the housing to be maintained above the threshold temperature (e.g., 175 degrees Celsius, or a different temperature) throughout the entire manufacturing of the fuel tank.

The method continues from 907 to 908 where the method includes positioning the strut inside the housing. In one example, positioning the strut inside the housing may include inserting the strut through the opening in the first wall of the housing, as indicated at 910. For example, as described above, the housing and strut may be formed as separate components, and the strut may be inserted through the opening of the housing in order to couple the strut to the housing.

The method continues from 908 to 912 where the method includes snap-fitting the flexible projection of the strut with the corresponding flange section in the first wall of the housing, the flange section surrounding the opening in the first wall of the housing, and with the flexible projection including a surface (e.g., surface 502) overlapping an interior surface (e.g., surface 504) of the flange section subsequent to the snap-fitting. In some examples, the snap-fitting may include deflecting the flexible projection inward toward a central axis of the strut as indicated at 914, moving the strut toward the second wall as indicated at 916, and mating the flange section with the fitting channel in the strut, the fitting channel positioned between the first end and the flexible projection as indicated at 918. Due to the heating of the second end of the strut and the second wall of the housing at 907, the second end of the strut and the second wall may be fused together at 920. It will be appreciated that step 914 and step 916 may be implemented during overlapping time intervals. For example, deflecting the flexible projection inward and moving the strut toward the second wall may occur at a same time, as described above (e.g., with reference to compressing the flexible projection 414 by pressing the flexible projection 414 against the flange section 302).

The method continues from 912 to 920 where the method includes fusing the second end of the strut spaced away from the flexible projection to the second wall of the housing, the second wall opposing the first wall. For example, the strut may be welded as shown by weld 500 of FIGS. 5-8. As described above, the second end of the strut and the second wall are heated prior to 920 such that the temperature of the second end of the strut and the second wall is increased above the threshold temperature. At 920, the heated second end of the strut and the heated second wall may be pressed together in order to fuse the second end of the strut to the second wall and permanently couple the second end of the strut to the second wall. As the second end of the strut and the second wall are pressed together, the material forming the second end of the strut and the second wall may mix and/or converge in order to fuse the second end and the second wall together.

The method continues from 920 to 922 where the method includes welding a cap (e.g., cap 210) onto an exterior surface (e.g., exterior surface 211) of the first wall, the cap covering the first end of the strut adjacent to the flexible projection. The welding in steps 920 and/or 922 may include a hot plate welding process, in one example. For example, the cap may be welded via weld 602 as shown by FIG. 6 and described above.

Method 900 enables the fuel tank to be efficiently manufactured with the reinforcing strut that increases the structural integrity of the fuel tank housing. As such, the manufacturing cost of the fuel tank can be reduced while constructing the tank with a desired amount of strength.

FIG. 10 shows another exemplary fuel tank 1000 having a strut with flexible projections that can move inward toward the axis of the strut. The fuel tank 1000 may be similar to fuel tank 200 and may include several components similar to the fuel tank 200. Similar components may be labeled similarly and not re-introduced. Further, strut 1006 may include several components similar to those included by the other struts described herein (e.g., strut 400), and similar components may be labeled similarly and not re-introduced. In one example, the strut 1006 may be hollow and made of homogeneous plastic which enables projections of the strut 1006 (e.g., flexible projections 1002) to have clearance to move in and snap back out.

For example, FIG. 10 shows the strut 1006 in a position in which the strut 1006 is inserted partially into the housing 202 of the fuel tank 1000 (e.g., via opening 300, similar to the examples described above). In the configuration shown by FIG. 10, the flexible projections 1002 (which may be similar to flexible projections 414) are deformed (e.g., bent inward) due to the flexible projections 1002 being pressed against the flange section 302 of the housing 202. Specifically, the flexible projections 1002 are moved (e.g., pivoted) in an inward direction 1030 toward central axis 416 of the strut 1006. Because the flexible projections 1002 may be made of homogeneous plastic as described above, the flexible projections 1002 may move in the inward direction 1030 during insertion of the strut 1006 into the housing 202, and after the flexible projections 1002 are positioned entirely within the housing 202 (e.g., such that no portion of the flexible projections 1002 is positioned externally relative to the housing 202), the flexible projections 1002 may snap back (e.g., pivot in an outward direction, opposite to the inward direction 1030) in order to return to their original, non-deformed shape.

Shaft 1004 of the strut 1006 may include a hollow interior section 1010 (e.g., similar to hollow interior section 700) and a plurality of openings 1008 (e.g., similar to opening 702), with the openings 1008 being positioned toward the first end 418 of the strut 1006. Each of the openings 1008 may be aligned with a corresponding flexible projection 1002 such that during conditions in which the flexible projections 1002 are pressed (e.g., compressed) in the inward direction 1030 as described above, the flexible projections 1002 pivot through the openings 1008 and into the hollow interior section 1010, as shown by FIG. 10. After the flexible projections 1002 are positioned entirely within the housing 202, the flexible projections 1002 then decompress and pivot outward through the openings 1008 and away from the hollow interior section 1010, locking the strut 1006 into the housing 202 of the fuel tank 1000. As described above, second end 420 of the strut 1006 may be welded to the second wall 402 of the housing 202 in order to secure the second end 420 to the housing 202. Further, a cap may be welded to first wall 208 across the opening 300 in order to seal the opening 300 with the strut 1006 disposed within the housing 202. In this configuration, fuel within the housing 202 may flow through the openings 1008 of the strut 1006 and into the hollow interior section 1010 in order to increase a fuel storage capacity of the fuel tank 1000 while strut 1006 increases a strength (e.g., resistance to deflection of first wall 208 and/or second wall 402) of the housing 202.

FIG. 11 shows another exemplary fuel tank 1100 having a hollow strut where the projections again have clearance to move inward. In one example, the fuel tank 1100 is similar to fuel tank 200 and fuel tank 1000 described above. Components of the fuel tank 1100 similar to those described above with reference to fuel tank 200 and/or fuel tank 1000 (e.g., strut 1006) may be labeled similarly and not re-introduced.

In the configuration shown by FIG. 11, the flexible projections 1002 of the strut 1006 are positioned entirely within the housing 202 and are shown in an uncompressed state (e.g., the flexible projections 1002 are not compressed, or pressed inward toward central axis 416, by the flange section 302). In this configuration, the flexible projections 1002 lock the strut 1006 to the housing 202, similar to the examples described above with reference to FIGS. 4-6. Further, FIG. 11 shows cap 210 positioned over opening 300 and welded to the first wall 208 at weld 1102 in order to seal the opening 300. Further, second end 420 of the strut 1006 is welded to the second wall 402 at weld 1104, securing the second end 420 of the strut 1006 to the second wall 402.

FIG. 12 shows a strut 1200 having a stamped metal clip 1206 with two or more projections 1202 that may be pressed onto a shaft 1204 of the strut 1200. The projections 1202 (e.g., flexible projections) may be pressed into cavities 1212 (e.g., clearance areas) on the strut 1200 during insertion of the strut 1200 into a fuel tank (e.g., fuel tank 200 and/or the other similar fuel tanks described herein), and may snap back into place after being inserted fully into the fuel tank (e.g., may return to their original, uncompressed shape). Friction teeth 1210 may hold the clip 1206 at a desired height on the shaft 1204 (e.g., a desired position on the shaft 1204 in a direction of central axis 416), and with the friction teeth 1210 of the clip 1206 resisting downward movement (e.g., movement toward a second end of the strut 1200 opposite to first end 1214, similar to second end 420 opposite to first end 418 described above) when in place (e.g., during conditions in which the projections 1202 are not pressed into the cavities 1212). Friction teeth 1210 are shown extending outward from annular section 1208 of the clip 1206, with the annular section 1208 having an inner diameter (e.g., a diameter of an opening of the annular section 1208 configured to encircle the shaft 1204) approximately the same as an outer diameter 1240 of the shaft 1204.

FIGS. 1-8 and FIGS. 10-12 show example configurations with relative positioning and sizing of the various components, although modifications may be made including changing the relative scaling and positioning of the components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, by inserting the strut into the housing of the fuel tank as described above, the housing may be formed via an efficient process such as blow molding and the strut may increase a strength of the housing (e.g., a deflection resistance of the housing). For example, the strut may be formed separately from the housing and may be inserted into the opening of the housing, with the opening being formed with the housing or bored into the housing. The flexible projections of the strut may compress as the strut is inserted into the housing, and may expand to their original, uncompressed shape after being fully inserted into the housing in order to lock the strut to the housing. The strut and second wall of the housing may be heated prior to insertion of the strut into the housing, and the second end of the strut may then be welded to the second wall of the housing. The opening of the housing may be sealed by welding the cap across the opening at the first end of the strut. By first welding the second end of the strut to the second wall of the housing, the strut provides support to the housing in order to enable the cap to be welded to the first wall of the opening and across the opening. For example, the cap may be hot plate welded to the first wall, with the strut increasing the deflection resistance of the first wall during the hot plate welding. As a result, a cost of manufacturing the fuel tank may be reduced. The technical effect of inserting the strut into the housing is to lock the strut to the housing via the flexible projections, and to increase the strength of the housing during the sealing of the opening of the housing.

The subject matter of the present disclosure is further described in the following paragraphs. According to one aspect, a method is provided. The method includes subsequent to molding of a housing of a fuel tank, positioning a strut inside the housing and snap-fitting a flexible projection of the strut with a corresponding flange section in a first wall of the housing, the flange section surrounding an opening in the first wall of the housing and the flexible projection including a surface overlapping an interior surface of the flange section subsequent to the snap-fitting.

According to another aspect, a fuel tank in a fuel delivery system is provided. The fuel tank includes a housing including a first wall opposing a second wall, the first wall including a flange section surrounding an opening, a strut extending between the first wall and the second wall, the strut including a flexible projection extending from a shaft of the strut, a first end, a second end, and a fitting channel positioned between the flexible projection and the first end, with a portion of the flange section extending into the fitting channel, and a weld connecting the second end to the second wall.

According to another aspect, a method for manufacturing a fuel tank in a fuel delivery system is provided. The method includes molding a plastic housing of the fuel tank, inserting a strut through an opening in a first wall of the plastic housing, and snap-fitting a flexible projection of the strut with a corresponding flange section in the first wall to mate a fitting channel in the strut with a portion of the flange section, the flange section surrounding the opening in the first wall.

In any of the aspects described herein or combinations of the aspects, the method may further include welding an end of the strut spaced away from the flexible projection to a second wall of the housing, the second wall opposing the first wall.

In any of the aspects described herein or combinations of the aspects, the method may further include welding a cap onto an exterior surface of the first wall, the cap covering an end of the strut adjacent to the flexible projection.

In any of the aspects described herein or combinations of the aspects, welding the cap onto the exterior surface may include hot plate welding the cap onto the exterior surface.

In any of the aspects described herein or combinations of the aspects, the method may further include, prior to positioning the strut inside the housing, blow molding the housing.

In any of the aspects described herein or combinations of the aspects, the method may further include, prior to positioning the strut inside the housing, boring the opening in the housing.

In any of the aspects described herein or combinations of the aspects, the method may further include, prior to positioning the strut inside the housing, molding the strut with the flexible projection.

In any of the aspects described herein or combinations of the aspects, the snap-fitting may include deflecting the flexible projection inward toward a central axis of the strut, moving the strut toward a second wall of the housing, and mating the flange section with a fitting channel in the strut positioned between the first end and the flexible projection.

In any of the aspects described herein or combinations of the aspects, subsequent to snap-fitting the flexible projection, a portion of the flange section may be positioned inside a strut channel, the strut channel positioned between an end of the strut and the flexible projection.

In any of the aspects described herein or combinations of the aspects, in the fuel tank the first end of the strut may be in contact with the first wall and the second end is in contact with the second wall of the housing.

In any of the aspects described herein or combinations of the aspects, in the fuel tank the shaft may include a hollow interior section in fluidic communication with an interior compartment of the housing.

In any of the aspects described herein or combinations of the aspects, in the fuel tank the housing and the strut may each include a plastic material.

In any of the aspects described herein or combinations of the aspects, the fuel tank may further include a cap extending across the first end of the strut and coupled to an exterior surface of the first wall.

In any of the aspects described herein or combinations of the aspects, the fuel tank may further include a second weld connecting the cap to the first wall.

In any of the aspects described herein or combinations of the aspects, in the fuel tank the second end of the strut may include a first plastic material consisting of polyethylene, and the remainder of the strut includes a different, second plastic material.

In any of the aspects described herein or combinations of the aspects, the method may further include welding a cap onto an outer surface of the first wall, the cap covering an end of the strut.

In any of the aspects described herein or combinations of the aspects, the method may further include blow molding the plastic housing.

In any of the aspects described herein or combinations of the aspects, the method may further include deflecting the flexible projection inward toward a central axis of the strut, moving the strut toward a second wall of the housing, and mating the flange section with the fitting channel.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and subcombinations of the various systems and configurations, and other features, functions, and/or properties disclosed herein.

The invention claimed is:
1. A method, comprising:
subsequent to molding of a housing of a fuel tank, positioning a strut inside the housing;

snap-fitting a flexible projection of the strut with a corresponding flange section in a first wall of the housing, where the first wall of the housing is a top wall of the fuel tank, the flange section recessed into the first wall of the housing and surrounding an opening in the first wall of the housing and the flexible projection includes a surface directly contacting an interior surface of the flange section subsequent to the snapfitting;

welding an end of the strut spaced away from the flexible projection to a second wall of the housing, the second wall opposing the first wall; and welding a cap onto an exterior surface of the first wall, the cap covering an end of the strut adjacent to the flexible projection and is substantially flush with the exterior surface of the first wall, where the end of the strut spaced away from the flexible projection and the second wall of the housing are heated to a temperature above a threshold temperature prior to positioning the strut inside the housing.

2. The method of claim 1, where welding the cap onto the exterior surface includes hot plate welding the cap onto the exterior surface.

3. The method of claim 1, further comprising, prior to positioning the strut inside the housing, blow molding the housing.

4. The method of claim 1, further comprising, prior to positioning the strut inside the housing, boring the opening in the housing.

5. The method of claim 1, further comprising, prior to positioning the strut inside the housing, molding the strut with the flexible projection.

6. The method of claim 1, where the snap-fitting includes deflecting the flexible projection inward toward a central axis of the strut, moving the strut toward the second wall of the housing, the second wall being a bottom wall of the fuel tank, and mating the flange section with a fitting channel in the strut positioned between a first end of the strut and the flexible projection;

where the first wall comprises a first surface and a second surface, the first surface being an outer, top surface, and the second surface being an inner, bottom surface, and where the flange section in the first wall comprises the first surface and the second surface, where the first surface of the flange section is lower than the second surface of the first wall surrounding the flange section; and subsequent to snap-fitting the flexible projection, a top surface of the flexible projection overlaps the second surface of the flange section so that attempts to move the strut in a direction away from the second wall of the fuel tank result in the top surface of the flexible projection pressing directly against the second surface of the flange section.

7. The method of claim 6, where, subsequent to snap-fitting the flexible projection, a portion of the flange section is positioned inside a strut channel, the strut channel positioned between an end of the strut and the flexible projection, and a top surface of the first end of the strut is lower than the second surface of the first wall.

8. A fuel tank in a fuel delivery system, comprising:
a housing including a first wall opposing a second wall, the first wall being a top wall of the housing, the second wall being a bottom wall of the housing, and the first wall including a flange section surrounding an opening;
a strut extending between the first wall and the second wall, the strut including a flexible projection extending from a shaft of the strut, a first end, a second end, and a fitting channel positioned between the flexible projection and the first end, with a portion of the flange section extending into the fitting channel, the portion of the flange section directly contacting the flexible projection, the flange section recessed into the first wall;
a cap extending across the first end of the strut and welded to an exterior surface of the first wall, the cap substantially flush with the exterior surface of the first wall; and
a weld connecting the second end to the second wall, where the second end and the second wall are heated to a temperature above a threshold temperature prior to positioning the strut inside the housing.

9. The fuel tank of claim 8, where the first end of the strut is in contact with the first wall and the second end is in contact with the second wall of the housing, where the first wall comprises a first surface and a second surface, the first surface being an outer, top surface, and the second surface being an inner, bottom surface, and where the flange section in the first wall comprises the first surface and the second surface; and subsequent to snap-fitting the flexible projection, a top surface of the flexible projection overlaps the second surface of the flange section so that attempts to move the strut in a direction away from the second wall of the fuel tank result in the top surface of the flexible projection pressing against the second surface of the flange section, and a top surface of the first end of strut is lower than the second surface of the first wall surrounding the flange section.

10. The fuel tank of claim 8, where the shaft includes a hollow interior section in fluidic communication with an interior compartment of the housing.

11. The fuel tank of claim 8, where the housing and the strut each include a plastic material.

12. The fuel tank of claim 8, where the second end of the strut includes a first plastic material consisting of polyethylene, and the remainder of the strut includes a different, second plastic material.

13. A method for manufacturing a fuel tank in a fuel delivery system, comprising:
molding a plastic housing of the fuel tank;
inserting a strut through an opening in a first wall of the plastic housing, the first wall being a top wall the plastic housing;
snap-fitting a flexible projection of the strut with a corresponding flange section in the first wall to mate a fitting channel in the strut with a portion of the flange section, the flange section recessed into the first wall of the housing surrounding the opening in the first wall and directly contacting the flexible projection;
welding a cap onto an outer surface of the first wall, the cap covering a first end of the strut and is substantially flush with the outer surface of the first wall; and
welding a second end of the strut to a second wall of the housing, the second wall being a bottom wall of the plastic housing, where the second end of the strut and the second wall are heated to a temperature above a threshold temperature prior to inserting the strut in the first wall of the plastic housing.

14. The method of claim 13, where molding the plastic housing includes blow molding the plastic housing.

15. The method of claim 13, where the snap-fitting includes deflecting the flexible projection inward toward a central axis of the strut, moving the strut toward the second wall of the housing, and mating the flange section with the fitting channel, where the first wall comprises a first surface and a second surface, the first surface being an outer, top surface, and the second surface being an inner, bottom surface, and where the flange section in the first wall comprises the first surface and the second surface; and subsequent to snap-fitting the flexible projection, a top surface of the flexible projection overlaps the second surface of the flange section so that attempts to move the strut in a direction away from the second wall of the fuel tank result in the top surface of the flexible projection pressing against the second surface of the flange section.

* * * * *